(12) United States Patent
Santamaria et al.

(10) Patent No.: US 9,561,601 B2
(45) Date of Patent: Feb. 7, 2017

(54) APPARATUS AND METHOD FOR MANUFACTURING A THERMAL AND/OR ACOUSTIC INSULATION PRODUCT

(71) Applicant: SAINT-GOBAIN ISOVER, Courbevoie (FR)

(72) Inventors: Romain Santamaria, Compiegne (FR); Hannu Konttila, Hyvinkaa (FI)

(73) Assignee: SAINT-GOBAIN ISOVER, Courbevoie (FR)

( * ) Notice: Subject to any disclaimer, the term of this patent is extended or adjusted under 35 U.S.C. 154(b) by 3 days.

(21) Appl. No.: 14/433,213

(22) PCT Filed: Oct. 3, 2013

(86) PCT No.: PCT/FR2013/052352
§ 371 (c)(1),
(2) Date: Apr. 2, 2015

(87) PCT Pub. No.: WO2014/053778
PCT Pub. Date: Apr. 10, 2014

(65) Prior Publication Data
US 2015/0266203 A1   Sep. 24, 2015

(30) Foreign Application Priority Data

Oct. 4, 2012  (FR) ...................................... 12 59410

(51) Int. Cl.
*D04H 1/4226* (2012.01)
*D04H 1/74* (2006.01)
(Continued)

(52) U.S. Cl.
CPC . *B27N 3/04* (2013.01); *B32B 5/26* (2013.01); *B32B 17/02* (2013.01); *D04H 1/4226* (2013.01);
(Continued)

(58) Field of Classification Search
None
See application file for complete search history.

(56) References Cited

U.S. PATENT DOCUMENTS 3,460,731 A   8/1969   Troth, Jr.
3,477,103 A   11/1969   Troth, Jr.
(Continued)

FOREIGN PATENT DOCUMENTS

EP    1 236 818 A1    9/2002
WO   WO 94/16162 A1   7/1994
(Continued)

OTHER PUBLICATIONS

International Search Report issued Nov. 21, 2013 in PCT/FR2013/052352 Filed Oct. 3, 2013.

*Primary Examiner* — Mary F Theisen
(74) *Attorney, Agent, or Firm* — Oblon, McClelland, Maier & Neustadt, L.L.P.

(57) ABSTRACT

An apparatus for manufacturing a thermal and/or acoustic insulation product based on mineral wool, including: a first line for production of first mineral fibers, including at least one fiberizing member; a second line for production of second mineral fibers, including at least one fiberizing member and a cross-lapping device; and a cross-lapping device configured to deposit the second mineral fibers onto the first mineral fibers by cross-lapping. The apparatus can manufacture a thermal and/or acoustic insulation product with improved thermal and/or acoustic properties.

12 Claims, 1 Drawing Sheet

(51) Int. Cl.
*E04B 1/76* (2006.01)
*B32B 17/02* (2006.01)
*B27N 3/04* (2006.01)
*B32B 5/26* (2006.01)

(52) U.S. Cl.
CPC ........... *D04H 1/74* (2013.01); *B32B 2262/101* (2013.01); *B32B 2262/108* (2013.01); *E04B 2001/7683* (2013.01)

(56) References Cited

U.S. PATENT DOCUMENTS

| 6,248,420 | B1 | 6/2001 | Brandt et al. |
| 2001/0006716 | A1 | 7/2001 | Brandt et al. |
| 2002/0116793 | A1 | 8/2002 | Schmidt |

FOREIGN PATENT DOCUMENTS

| WO | WO 97/32069 | A1 | 9/1997 |
| WO | WO 99/51535 | A1 | 10/1999 |
| WO | WO 02/059405 | A2 | 8/2002 |
| WO | WO 2009/024396 | A1 | 2/2009 |

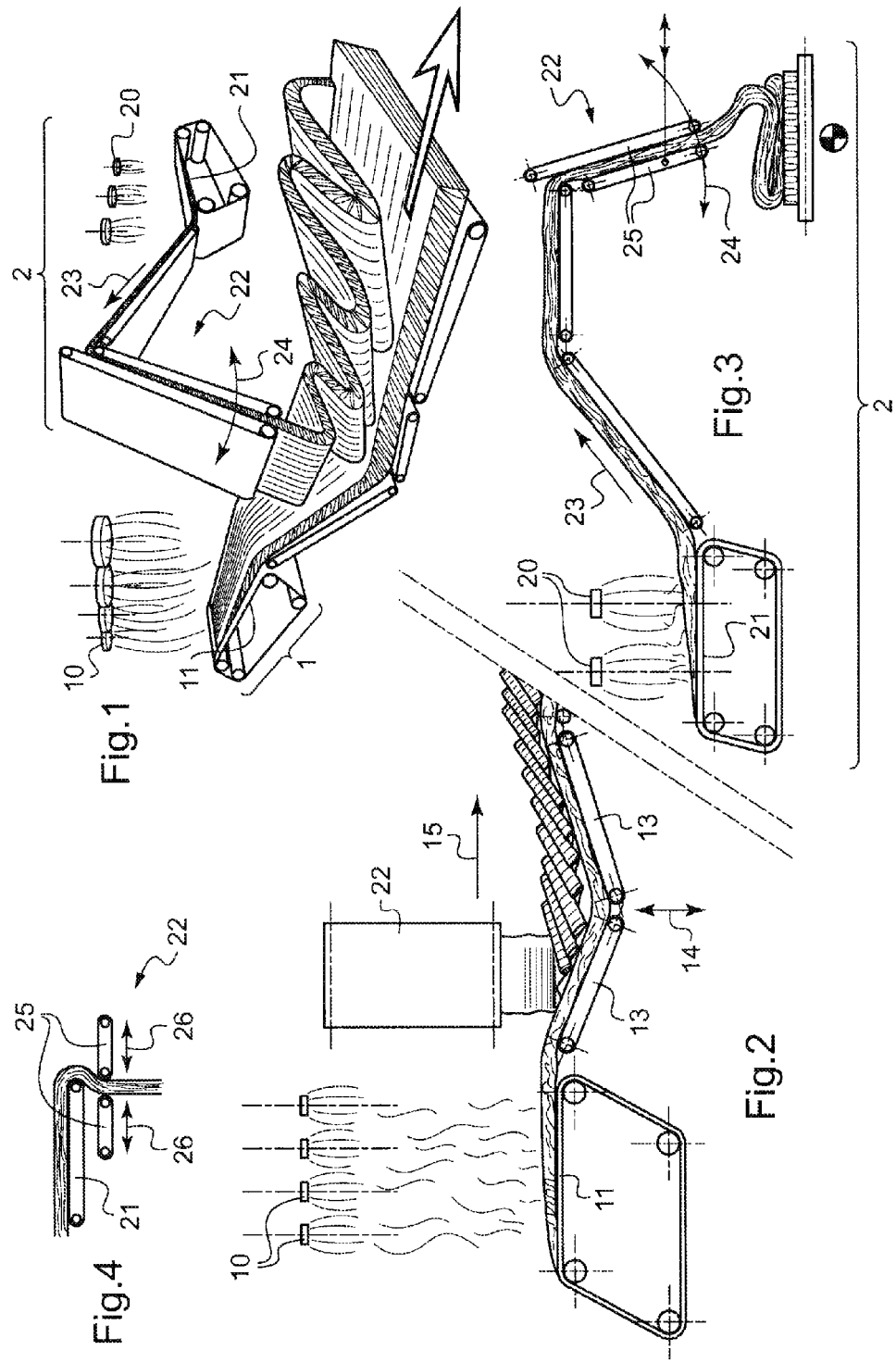

APPARATUS AND METHOD FOR MANUFACTURING A THERMAL AND/OR ACOUSTIC INSULATION PRODUCT

BACKGROUND

The invention relates to an apparatus and a method for manufacturing a thermal and/or acoustic insulation product based on mineral fibers.

The manufacture of insulation products based on mineral fibers, such as mineral wool panels, is known, for example by internal centrifugation of molten glass.

However, the thickness of such a thermal and/or acoustic insulation product is limited by the average diameter of the fibers and the grammage that it is possible to achieve on a line for the manufacture of mineral fibers, which will in turn limit the thermal and/or acoustic insulation properties, which are directly linked to the grammage. The grammage is limited by the suction generated beneath the receiving belt for the mineral fibers.

The need exists, therefore, for an apparatus and a method for manufacturing a thermal and/or acoustic insulation product which permits its thermal and/or acoustic properties to be improved.

BRIEF SUMMARY

For this purpose, the invention proposes an apparatus for manufacturing a thermal and/or acoustic insulation product based on mineral wool, comprising:
  a first line for the production of first mineral fibers, comprising at least one fiberizing member,
  a second line for the production of second mineral fibers, comprising at least one fiberizing member and a cross-lapping device,
  the cross-lapping device being adapted to deposit the second mineral fibers onto the first mineral fibers by cross-lapping.

According to another feature, the first production line and/or the second production line each comprises at least two fiberizing members, the different members on each production line being arranged in series.

According to another feature, the apparatus further comprises a crimping machine, positioned between the one or more fiberizing members of the first production line and the cross-lapping device, adapted to crimp the first mineral fibers before they are overlaid by the second mineral fibers, and/or downstream of the cross-lapping device, adapted to crimp the first mineral fibers overlaid by the second mineral fibers.

According to another feature, the apparatus further comprises a drying oven adapted to receive the first mineral fibers overlaid by the second mineral fibers.

According to another feature, each fiberizing member of at least one of the production lines comprises:
  an internal centrifugation spinner adapted to rotate about its substantially vertical axis of symmetry, the peripheral band of which is perforated by a plurality of orifices,
  an annular burner adapted to perform gaseous stretching at high temperature at the exit from the orifices of the centrifugation spinner,
  optionally, a blowing ring adapted to channel the fibers towards a first or second conveyor belt,
  optionally, a gluing ring adapted to spray a binding compound onto the fibers before they reach the first or the second conveyor belt.

According to another feature, the cross-lapping device is a vertical or horizontal cross-lapping device.

According to another feature, the first and second production lines are substantially perpendicular to each other.

The invention also relates to a method for manufacturing a thermal and/or acoustic insulation product based on mineral wool, comprising the following stages:
  manufacture of first mineral fibers on a first production line by at least one fiberizing member,
  manufacture of second mineral fibers on a second production line by at least one fiberizing member,
  passage of the second mineral fibers into a cross-lapping device,
  deposition by cross-lapping of the second mineral fibers onto the first mineral fibers by the cross-lapping device.

According to another feature, the method further comprises a stage of passage into a crimping machine of the first mineral fibers on their own and/or of the first mineral fibers overlaid by the second mineral fibers.

According to another feature, the method further comprises a stage of passage of the first mineral fibers overlaid by the second mineral fibers into a drying oven.

BRIEF DESCRIPTION OF THE DRAWINGS

Other characterizing features and advantages of the invention will now be described with reference to the drawings, in which:

FIG. 1 represents a perspective view of an apparatus according to the invention for manufacturing a thermal and/or acoustic insulation product;

FIGS. 2 and 3 are side views of the apparatus according to FIG. 1;

FIG. 4 is a side view of a horizontal cross-lapping device.

DETAILED DESCRIPTION

The reference numbers, which are identical in the different figures, represent similar or identical elements.

The invention relates to an apparatus for manufacturing a thermal and/or acoustic insulation product based on mineral wool. The apparatus comprises a first line for the production of first mineral fibers. This first production line comprises at least one fiberizing member. The apparatus further comprises a second line for the production of second mineral fibers. This second line comprises at least one fiberizing member and a cross-lapping device. The cross-lapping device is adapted to deposit the second mineral fibers onto the first mineral fibers by cross-lapping.

The thickness of the insulating product may thus be increased while maintaining an average fiber diameter (or micronaire) and a grammage that are technically achievable, which permits the thermal and/or acoustic properties of the product to be improved without changing its average fiber diameter and its grammage.

FIG. 1 represents a perspective view of an apparatus according to the invention for manufacturing a thermal and/or acoustic insulation product. FIGS. 2 and 3 are side views of the apparatus according to FIG. 1.

The apparatus comprises a first production line 1 for producing first mineral fibers. This first production line 1 comprises at least one fiberizing member 10. The first production line 1 preferably comprises a plurality of fiberizing members 10, arranged in series on one and the same line in such a way as to produce a larger quantity of mineral fibers. Even more preferably, the first production line 1 comprises a maximum of ten fiberizing members 10, for example eight fiberizing members 10. Such a number of members 10 thus permits the production of a first layer of mineral fibers having a grammage of between 500 and 8000 g/m², preferably between 3000 and 5500 g/m², and more preferably still between 3000 and 4000 g/m².

The fiberizing is realized, for example, by internal centrifugation. In this case, each fiberizing member 10 comprises an internal centrifugation spinner adapted to rotate about its substantially vertical axis of symmetry. The peripheral band of the internal centrifugation spinner is perforated by a plurality of orifices, via which filaments of molten glass emerge. Each member 10 for fiberizing by internal centrifugation further comprises an annular burner adapted to perform gaseous stretching of the filaments at high temperature at the exit from the orifices of the internal centrifugation spinner, in order to stretch the filaments into mineral fibers. Each member for fiberizing by internal centrifugation may further comprise a blowing ring adapted to channel the fibers towards a first belt 11 for conveying the mineral fibers. Each member 10 for fiberizing by internal centrifugation may further comprise a gluing ring adapted to spray a binding compound onto the fibers before they reach the first conveyor belt 11. Different values, such as the pressure and the temperature of the annular burner, the diameter of the internal centrifugation spinners, the presence or otherwise of an air blowing ring, the air blowing pressure, or the composition of the molten glass, may be adjusted to obtain mineral fibers having an average fiber diameter and a grammage as required.

All of the first mineral fibers produced by the different fiberizing members 10 on the first production line 1 land on the first conveyor belt 11, which advances at a speed ranging between 3 and 100 m/min, and preferably between 3 and 20 m/min. The first mineral fibers then form a first layer of mineral fibers. Fans situated beneath the conveyor belt permit a part of the air contained in the first layer of fibers to be extracted by suction in such a way as to increase the density of the layer.

The apparatus further comprises a second line 2 for the production of second mineral fibers. This second production line 2 comprises at least one fiberizing member 20. The second production line 2 preferably comprises a plurality of fiberizing members 20, arranged in series on one and the same line in such a way as to produce a larger quantity of mineral fibers. Even more preferably, the second production line 2 comprises, for example, three fiberizing members 20. The fiberizing members 20 are, for example, of the same type as those of the first production line 1. The different adjustable values may be selected differently on the two production lines 1, 2. The second mineral fibers can thus be different from the first mineral fibers. The difference may relate to the composition of the glass, the presence or otherwise of a binding agent, the characteristics of the fibers due to the fiberizing parameters. The average diameter of the fibers and the grammage may thus be different between the first fibers and the second fibers.

All of the second mineral fibers produced by the different fiberizing members 20 on the first production line 2 land on a second conveyor belt 21, which advances at a speed ranging between 10 and 200 m/min, and preferably between 10 and 120 m/min. The second mineral fibers then form a second layer of mineral fibers. Fans situated beneath the conveyor belt permit a part of the air contained in the second layer of fibers to be extracted by suction in such a way as to increase the density of the layer.

The second production line 2 further comprises a cross-lapping device 22 arranged downstream of the fiberizing members 20. The cross-lapping device 22 is adapted to deposit the second mineral fibers produced onto the second production line 2, on top of the first layer, consisting of the first mineral fibers produced on the first production line 1. The second mineral fibers are arranged in the form of several superimposed layers, preferably numbering between three and nine layers.

The grammage of the second mineral fibers before cross-lapping lies in the range between 100 and 1000 g/m², and preferably between 400 and 600 g/m².

The higher the draw imposed on the first line 1, the lower the grammage of the insulation product constituted by a layer of first mineral fibers overlaid by superimposed layers of laid second mineral fibers. The grammage of such a product lies in the range between 3000 g/m² and 16,000 g/m², for example in the order of 8300 g/m² (for a micronaire of 9 l/min). Such an insulation product has a thickness of about 300 mm and a thermal conductivity of about 32 mW/m·K.

This permits the thickness of the layer of first mineral fibers to be increased by adding a plurality of layers of second mineral fibers, which permits an insulating product with improved thermal and/or acoustic properties to be obtained.

As depicted in FIGS. 1 and 3 by the arrow 23, the second conveyor belt 21 is able to rise up between the fiberizing members 20 and the cross-lapping device 22.

The cross-lapping device 22 is vertical, for example, as depicted in FIGS. 1 to 3, or horizontal, as depicted in FIG. 4.

The vertical cross-lapping device 22 comprises two belts 25 with principal surfaces, intended to be in contact with the second mineral fibers, which are parallel and face one another. The two belts 25 move at the same speed and draw the two mineral fibers between them, against their principal surfaces. The two belts 25 oscillate together about a horizontal axis parallel to their principal surfaces, as illustrated by the arrow 24 in FIGS. 1 and 3.

The horizontal cross-lapping device 22 comprises two belts 25 with principal surfaces which are parallel and are situated in the same horizontal plane. The two belts 25 move in horizontal translation (arrows 26), at the same speed and in the same direction, simultaneously, drawing the second mineral fibers so that they pass between their facing edges.

The vertical or the horizontal cross-lapping device 22 preferably deposits the second mineral fibers in a direction forming a non-zero angle in relation to the first belt 11 for conveying the first mineral fibers. This angle is preferably in the order of 90°. The number of layers of second mineral fibers may thus be higher or lower, as a function of the respective speeds of the first conveyor belt 11 and the cross-lapping device 22 (speed of oscillation and speed of the belts 25 of the vertical cross-lapping device or speed of translation and speed of the belts 25 of the horizontal cross-lapping device), resulting in a variable total thickness of second mineral fibers as a function of the operating parameters.

Thus, for example, for a conveying speed of 3.5 m/min on the first production line 1, it is possible to obtain a layer of first mineral fibers with a grammage of 4200 g/m². For a conveying speed of 44.9 m/min on the second production line 2, and an oscillating frequency of 8.65 cycles per minute, it is possible to obtain six layers of second mineral fibers, each with a grammage of 619 g/m². The total grammage of the final insulation product is then 7200 g/m².

As can be appreciated from FIGS. 1 to 3, the first conveyor belt 11 is a conveyor belt 13 that is common to the two production lines 1, 2 once the second mineral fibers have been deposited onto the first mineral fibers. At least one section of the common conveyor belt 13 can be adjusted up or down, as illustrated by the arrow 14. The arrow 15 indicates the direction of advance of the common conveyor belt 13.

The apparatus further preferably comprises a crimping machine, which permits the density of the mineral fibers to be increased. The crimping machine is positioned on the first production line, between the fiberizing members 10 and the cross-lapping device 22, for the purpose of crimping the layer of first mineral fibers before the second mineral fibers are deposited on top, and/or downstream of the cross-lapping device 22, for the purpose of crimping the assembly constituted by the first mineral fibers overlaid by the second mineral fibers. A crimping machine comprises two belts with principal surfaces, intended to be in contact with the mineral fibers, which are parallel and face one another. The two belts move at different speeds and draw the second mineral fibers between them, against their principal surfaces.

The apparatus further comprises a drying oven if the mineral fibers have been sized on the production lines. The drying oven is situated on the common conveyor belt 13, downstream of the cross-lapping device 22 and downstream of the crimping machine in the event that the apparatus comprises a crimping machine downstream of the cross-lapping device 22. The drying oven permits the binding compound to be polymerized in order to impart cohesion to the fibers. The advantage of passing the assembly constituted by the first and the second overlaid mineral fibers into the drying oven makes it possible to obtain very good cohesion of the fibers as a whole of the insulation product, even if the fibers originate from two basically distinct production lines.

The invention also relates to the method for manufacturing the thermal and/or acoustic insulation product based on mineral wool with the help of the apparatus according to the invention. The method comprises the following stages:

manufacture of the first mineral fibers on the first production line 1 by at least one fiberizing member 10, manufacture of the second mineral fibers on the second production line 2 by at least one fiberizing member 20, passage of the second mineral fibers into the cross-lapping device 22, deposition by cross-lapping of the second mineral fibers onto the first mineral fibers by the cross-lapping device 22.

The method further comprises, optionally, a stage of passing the mineral fibers into a crimping machine and/or into a drying oven.

The invention claimed is:

1. An apparatus for manufacturing a thermal and/or acoustic insulation product based on mineral wool, comprising:
    a first line for production of first mineral fibers, comprising at least one fiberizing member;
    a second line for production of second mineral fibers, comprising at least one fiberizing member and a cross-lapping device,
    the cross-lapping device being configured to deposit the second mineral fibers onto the first mineral fibers by cross-lapping.

2. The apparatus as claimed in claim 1, wherein the first production line and/or the second production line each comprises at least two fiberizing members, different members on each production line being arranged in series.

3. The apparatus as claimed in claim 1, further comprising a crimping machine, positioned between the at least one fiberizing member of the first production line and the cross-lapping device, configured to crimp the first mineral fibers before they are overlaid by the second mineral fibers, and/or downstream of the cross-lapping device, configured to crimp the first mineral fibers overlaid by the second mineral fibers.

4. The apparatus as claimed in claim 1, further comprising a drying oven configured to receive the first mineral fibers overlaid by the second mineral fibers.

5. The apparatus as claimed in claim 1, wherein each fiberizing member of at least one of the production lines comprises:
    an internal centrifugation spinner configured to rotate about its substantially vertical axis of symmetry, a peripheral band of which is perforated by a plurality of orifices;
    an annular burner configured to perform gaseous stretching at high temperature at an exit from the orifices of the centrifugation spinner.

6. The apparatus as claimed in claim 5, further comprising:
    a blowing ring configured to channel the fibers towards a first or second conveyor belt.

7. The apparatus as claimed in claim 6, further comprising:
    a gluing ring configured to spray a binding compound onto the fibers before they reach the first or the second conveyor belt.

8. The apparatus as claimed in claim 1, wherein the cross-lapping device is a vertical or horizontal cross-lapping device.

9. The apparatus as claimed in claim 1, wherein the first and second production lines are substantially perpendicular to each other.

10. A method for manufacturing a thermal and/or acoustic insulation product based on mineral wool, comprising:
    manufacture of first mineral fibers on a first production line by at least one fiberizing member;
    manufacture of second mineral fibers on a second production line by at least one fiberizing member;
    passage of the second mineral fibers into a cross-lapping device;
    deposition by cross-lapping of the second mineral fibers onto the first mineral fibers by the cross-lapping device.

11. The method as claimed in claim 10, further comprising passage into a crimping machine of the first mineral fibers on their own and/or of the first mineral fibers overlaid by the second mineral fibers.

12. The method as claimed in claim 10, further comprising passage of the first mineral fibers overlaid by the second mineral fibers into a drying oven.

* * * * *